US005926543A

United States Patent [19]

Lynn et al.

[11] Patent Number: 5,926,543

[45] Date of Patent: *Jul. 20, 1999

[54] HEADSET AMPLIFIER WITH AUTOMATIC LOG ON/LOG OFF DETECTION

[75] Inventors: Dwight D. Lynn; Kirk A. Reid; Shu-Ren Chen, all of Santa Cruz, Calif.

[73] Assignee: GN Netcom, Inc., Scotts Valley, Calif.

[ * ] Notice: This patent is subject to a terminal disclaimer.

[21] Appl. No.: 08/354,237

[22] Filed: Dec. 12, 1994

Related U.S. Application Data

[63] Continuation of application No. 08/062,614, May 11, 1993, Pat. No. 5,488,657, which is a continuation of application No. 07/844,739, Mar. 2, 1992, Pat. No. 5,226,077

[51] Int. Cl.[6] .......... H04M 1/00

[52] U.S. Cl. .......... 379/395; 379/214

[58] Field of Search .......... 379/395, 387, 379/266, 214, 265, 267, 212, 113

[56] References Cited

U.S. PATENT DOCUMENTS

| | | | |
|---|---|---|---|
| 3,571,518 | 3/1971 | Chipman et al. | 179/27 |
| 3,851,111 | 11/1974 | Young | 179/51 |
| 4,048,452 | 9/1977 | Oehring et al. | 179/27 |
| 4,197,430 | 4/1980 | Dowden | 179/27 |
| 4,400,587 | 8/1983 | Taylor et al. | 179/27 |
| 4,449,017 | 5/1984 | Burke et al. | 179/27 |
| 4,499,337 | 2/1985 | Elbaek | 179/27 |
| 4,562,310 | 12/1985 | Watters et al. | 179/100 |
| 4,620,066 | 10/1986 | Bushnell et al. | 179/27 |
| 4,672,663 | 6/1987 | Tomasi | 379/388 |
| 4,682,354 | 7/1987 | Vanacore | 379/211 |
| 4,951,310 | 8/1990 | Honda et al. | 379/266 |
| 5,062,103 | 10/1991 | Davidson et al. | 370/58.1 |
| 5,073,890 | 12/1991 | Danielsen | 370/58.2 |
| 5,226,077 | 7/1993 | Lynn et al. | 379/395 |

*Primary Examiner*—Daniel S. Hunter

*Attorney, Agent, or Firm*—Limbach & Limbach L.L.P.

[57] ABSTRACT

Existing automatic log on/log off systems in telephone systems determine whether or not a workstation is occupied and whether calls can be directed to that workstation by determining whether or not the amplifier that provides the interface between the telephone system and the occupant's headset is plugged into the workstation. Recent headsets have included a connector in the cord between the headset and the amplifier, enabling the occupant to leave the workstation without unplugging the amplifier. However, this defeats the sensing mechanism of the existing automatic log on/log off system. An amplifier according to the invention replaces the existing amplifier and includes a detector for determining whether a communication link exists between the headset and the amplifier, and an activator for activating the existing automatic log on/log off system in the telephone system. In the preferred embodiment, the detector senses both interruption and reestablishment of the communication link between the headset and the amplifier, and the activator activates both current-sensing and voltage/resistance-sensing automatic log on/log off systems.

34 Claims, 11 Drawing Sheets

HEADSET AMPLIFIER WITH AUTOMATIC LOG ON/LOG OFF DETECTION

This application is a continuation of Ser. No. 08/062,614 filed May 11, 1993, now U.S. Pat. No. 5,488,657, which is a continuation of Ser. No. 07/844,739 filed Mar. 2, 1992, now U.S. Pat. No. 5,226,077.

BACKGROUND OF THE INVENTION

Telephone headsets are an important element of modern business equipment. They provide hands-free communication, and improve productivity, in a variety of applications, such as operator and information services.

One of the main applications of telephone headsets is in connection with automatic in-bound and out-bound telephone systems. Such systems generally include an Automatic Call Distributor (ACD). In a telephone system with an ACD, a computer automatically routes telephone calls to workstations connected to the system in a way that balances the call load equally between the workstations. Each workstation can be occupied by a telephone representative. For a telephone system with ACD to work properly, each telephone representative is required to log on to the system each time he/she occupies his/her workstation, and to log off the system each time he/she leaves his/her workstation. This is necessary so that the ACD will route calls to all occupied workstations, and will not route calls to any unoccupied workstations. If a representative leaves his/her workstation without logging off, the ACD system will continue to route calls to that workstation. Such calls are not responded to, or a response is delayed. A representative failing to log on to the system increases the load on the other representatives, and increases the time required to respond to incoming calls. The failure of a representative either to log on to or log off the system consequently results in a reduced quality of service.

The need for a telephone system to determine whether a workstation is occupied is not restricted to telephone systems with an ACD. For example, the sole telephone operator in a small office is also required to log off when away from his/her workstation so that incoming calls do not go unanswered.

To improve the quality of service provided by telephone systems in which the presence of a representative or operator at a workstation impacts the quality of service, it is desirable that logging on and logging off be automated.

A typical workstation includes a telephone headset connected to an amplifier. The amplifier is, in turn, connected to the workstation, which is connected to the telephone system. The amplifier is powered by current drawn from the telephone system. Automated log on/log off systems are known in which the representative has to unplug the amplifier from the workstation to log off automatically. The automatic log on/log off system monitors each workstation to determine whether or not an amplifier is connected to the workstation. The system logs the representative off when it determines that the amplifier has been disconnected from the workstation. Some types of automatic log on/log off system log the representative back on when it determines that the amplifier has been re-connected to the workstation. Other types require the representative to log back in manually.

Such automatic log on/log off systems determine whether the amplifier is connected to the workstation by monitoring some parameter that depends on whether or the amplifier is connected, such as the current drawn from the telephone system by the amplifier, or the resistance between a pair of contacts.

The log on/log off system just described is regarded as automatic, even though the representative has to connect or disconnect the amplifier, because operators prefer to continue to wear their headsets when away from their workstations, especially if the time away from the workstation is short. To be able to leave the workstation while wearing the headset, the representative has to unplug the amplifier, and has to carry the amplifier around while away from the workstation.

Recently, headset manufacturers have made it easier for a representative to leave his/her workstation while wearing his/her headset by providing a connector in the cord between the headset and the amplifier. The representative can then wear the headset while he/she is away from the workstation and no longer has to carry the amplifier. However, disconnecting the headset using the connector in the cord defeats the known automatic log in/log out systems, because the representative can leave the workstation without unplugging the amplifier, and disconnecting the headset using the connector in the cord does not change any of the parameters monitored by the known automatic log on/log off systems.

The invention provides an amplifier for connection to a telephone system. The telephone system includes a circuit for monitoring when a peripheral device, such as the amplifier, is connected to it. The monitoring circuit operates to detect a change in a parameter which occurs when the peripheral device is disconnected from the telephone system. Additionally, the amplifier is capable of establishing a communication link with a telephone headset and conveying signals between the headset and the telephone system. The amplifier includes a detecting circuit and an activating circuit. The detecting circuit detects when a communication link between the headset and the amplifier is interrupted and generates an output signal in response thereto. The activating circuit operates in response to the output signal and changes the parameter in a manner that emulates disconnecting the amplifier from the telephone system, even though the amplifier remains connected.

For example, if the monitoring circuit in the telephone system monitors an additional pair of contacts in the workstation, the activating circuit includes an additional pair of contacts. The activating circuit changes the resistance between the contacts in response to the detecting circuit's determination of when communication link between the headset and the amplifier is interrupted. If the monitoring circuit in the telephone system monitors the current drawn by the amplifier, the activating circuit changes the current drawn by the amplifier in response to the detecting circuit's determination of when the communication link between the headset and the amplifier is interrupted. Normally, the activating circuit reduces the current drawn by the amplifier when the communication link between the headset and the amplifier is interrupted.

The detecting circuit detects when a communication link exists between the headset and the amplifier by determining a change that occurs when such a link occurs. The change can be in the voltage or resistance between two conductors in a cord connecting the headset and the amplifier. For example, in one embodiment, the detecting circuit detects a change in a current drawn from the amplifier by the headset. Alternatively, the change can also be in the strength of a signal communicated between the headset and the amplifier. For example, in one embodiment, the detecting circuit detects a change in the level of an ac voltage transmitted between the headset and the amplifier.

The monitoring circuit in the telephone system may additionally operate to detect a change in the parameter which occurs when the peripheral device is reconnected to the telephone system. In this case, the detecting circuit may additionally detect when the communication link between the headset and the amplifier is reestablished and may generate an additional output signal in response thereto. The activating circuit may then additionally operate in response to the additional output signal to change the parameter in a manner that emulates reconnecting the amplifier to the telephone system, even though the amplifier has not been disconnected.

The invention also provides a method of activating an automatic monitoring circuit in a telephone system in response to an interruption in a communication link between a headset and an amplifier connected to the telephone system. The automatic monitoring circuit monitors when a peripheral device, such as the amplifier, is connected to the telephone system by detecting a change in a parameter which occurs when the peripheral device is disconnected from the telephone system. The method includes: the steps of detecting when a communication link between the headset and the amplifier is interrupted, and generating an output signal in response thereto; and changing the parameter in response to the output signal in a manner to emulate disconnecting the amplifier from the telephone system, even though the amplifier remains connected.

DETAILED DESCRIPTION OF THE DRAWINGS

Figure 9:
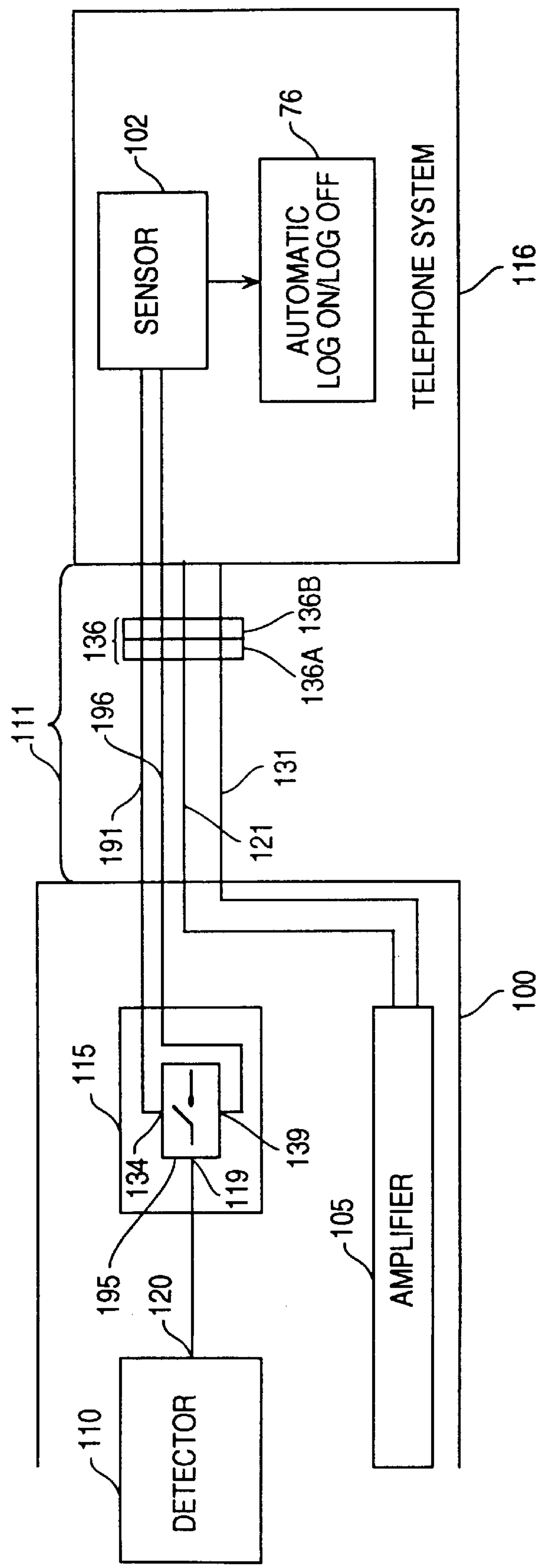

FIG. 9 is a block diagram of the activator part of a headset amplifier with automatic log on/log off detection according to the invention in which the activator activates a resistance/voltage sensing type of automatic log on/log off system in which the detector detects the current drawn by the headset microphone and the activator can activate both current sensing and resistance/voltage sensing automatic log on/log off systems.

Figure 10:
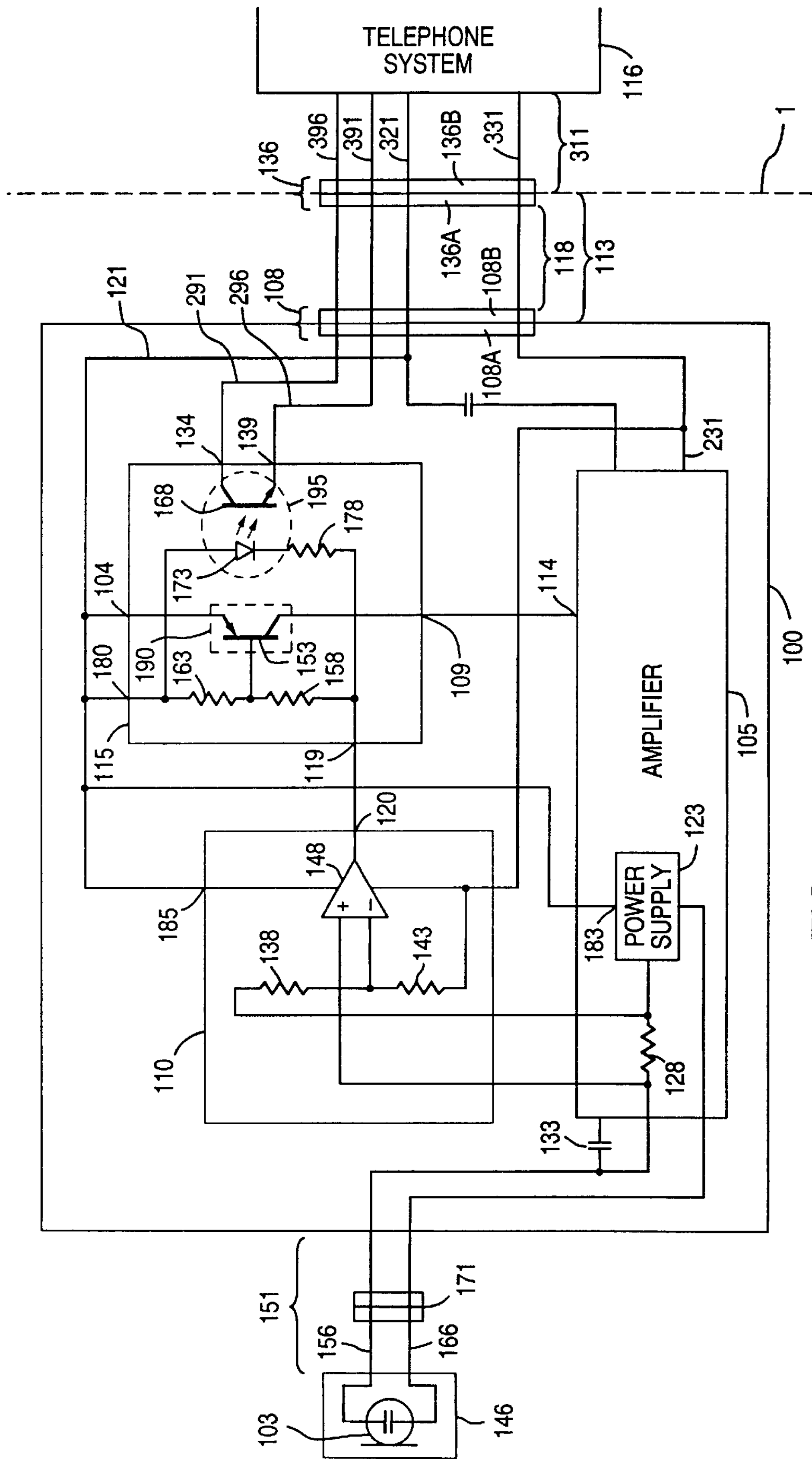

FIG. 10 is a schematic diagram of the preferred embodiment of a headset amplifier with automatic log on/log off detection according to the invention.

Figure 11:
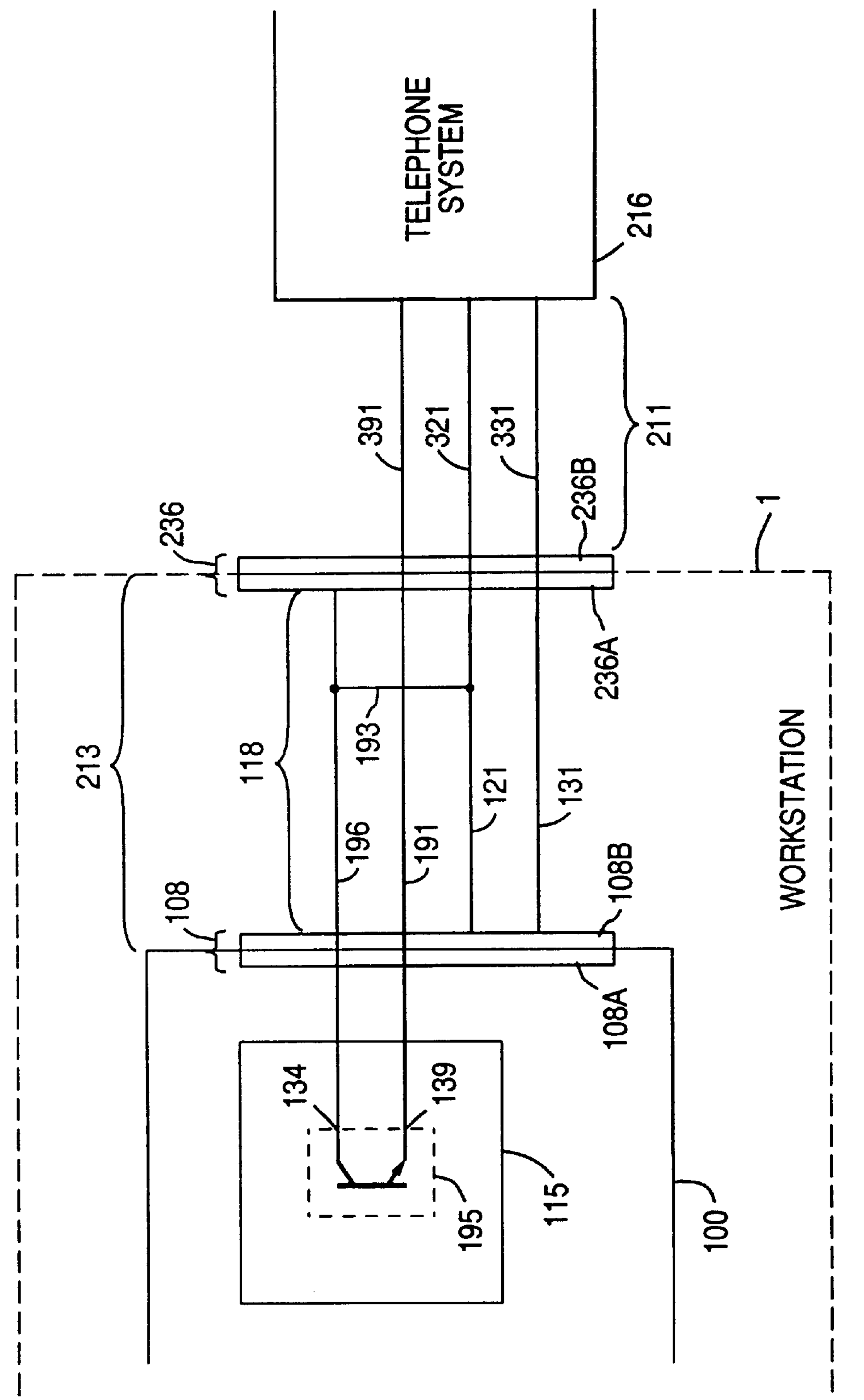

FIG. 11 is a schematic diagram of a headset amplifier with automatic log on/log off detection according to the invention showing how a different interconnect can be used to adapt the amplifier for use with a different type of telephone system.

DETAILED DESCRIPTION OF THE INVENTION

Figure 1:
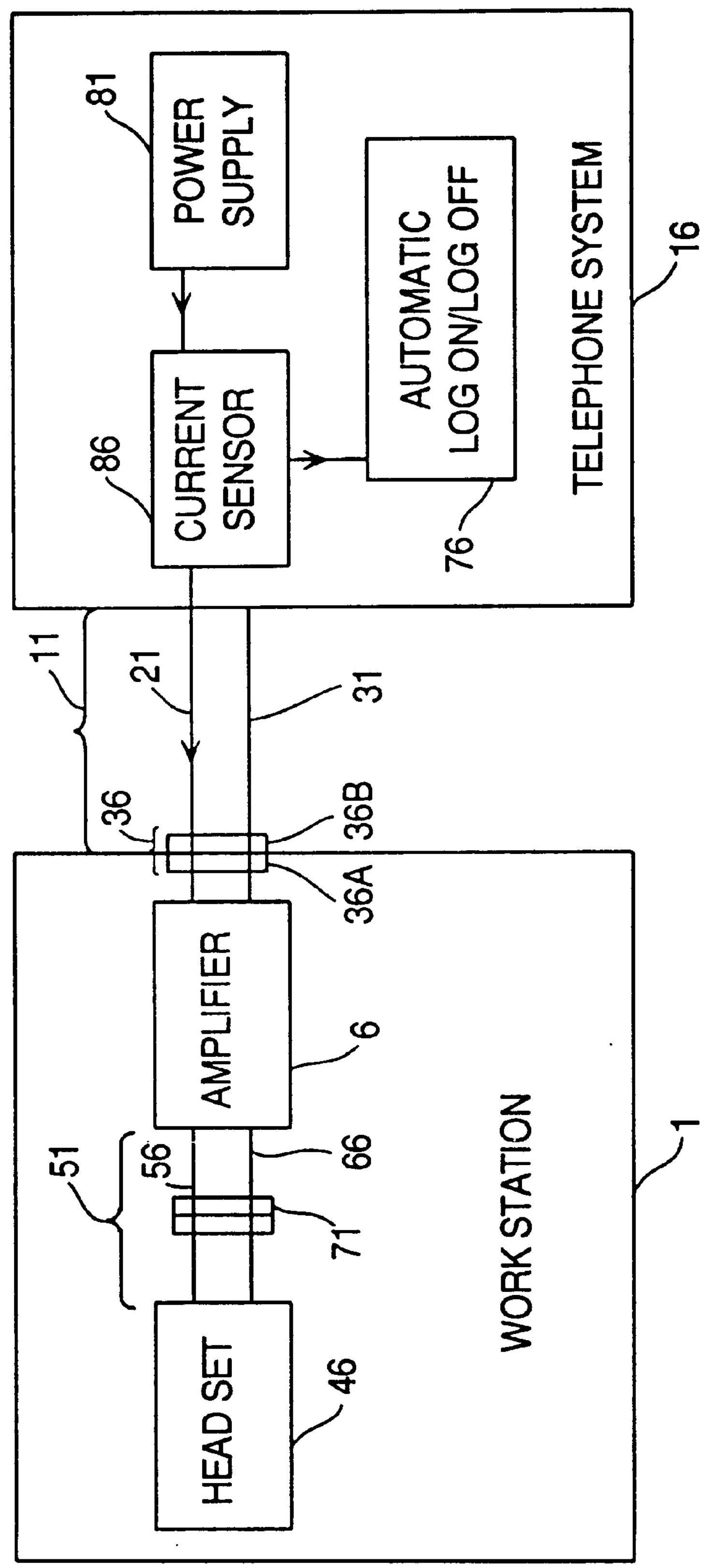
FIG. 1 is a block diagram of a telephone system with an automatic log on/log off system that determines whether or not the amplifier is connected by sensing the current drawn from the telephone system.

A typical telephone system with an automatic log on/log off system is shown in FIG. 1. The workstation 1, which is normally one of several workstations connected to the telephone system 16, has an amplifier 6 to provide an interface between the telephone system 16 and the headset 46. The cord 11 connects the amplifier to the telephone system 16. The amplifier is powered by the telephone system, and draws a current of several milliamps from the telephone system. The cord 11 includes the conductor 21 for DC power and the conductor 31, which provides the ground connection. The transmit signal from the amplifier 6 is normally superimposed on the conductor 21. Alternatively, an additional conductor (not shown) in the cord 11 may be used for the transmit signal. Finally the cord 11 includes receive conductors, which have been omitted for clarity. The cord 11 is interrupted by the connector 36, comprising the plug 36A and the socket 36B, which is normally mounted on the workstation 1. The connector 36 allows the amplifier 6 and the headset 46 to be disconnected from the workstation.

The headset 46 includes an earphone (not shown) and a microphone (not shown). Typically, an electret microphone is used, which requires that the amplifier 6 supply DC power of a few volts at between 25 and several hundred microamps to the headset. The cord 51 interconnects the headset and the amplifier. The cord 51 includes the conductor 56 for DC power and the conductor 66, which provides the ground connection. The transmit signal from the microphone in the headset (not shown) is normally superimposed on the conductor 56. Alternatively, an additional conductor (not shown) may be used for the transmit signal. Finally, the cord 51 includes receive conductors, which have been omitted for clarity. The cord 51 is interrupted by the connector 71, comprising the plug 71A and the socket 71B. The connector 71 enables the representative to disconnect the headset from the amplifier when he/she leaves the workstation 1. Normally, the connector 71 is mounted in the cord 51 close to the headset, but it can be an integral part of the headset or an integral part of the amplifier.

Applications handling a large volume of telephone calls, such as telemarketing, bank customer service, or airline reservations, have a plurality of workstations, each with its own telephone connector 36, amplifier 6, headset 46 and necessary interconnecting cords. The workstations are connected to the telephone system 16. The telephone system may include an Automatic Call Distributor (ACD) for distributing the calls evenly between occupied workstations, i.e., workstations at which a representative is logged on. Smaller telephone systems lack an ACD, but the invention can be applied to a telephone system without an ACD.

The telephone system 16 includes an automatic log on/log off system 76 that automatically logs a workstation off the telephone system when the occupant leaves the workstation. Some automatic log-on/log off systems automatically log the workstation back onto the telephone system when the occupant returns. Other automatic log on/log off systems require the occupant to log back in manually.

The cord 11 connects the amplifier 6 to the telephone system 16. When the amplifier 6 is disconnected from the telephone system 16, the automatic log on/log off system 76 causes the telephone system to take an action that is appropriate in view of the fact that the workstation is no longer occupied. For example, in a small office system with a single telephone operator, it can cause the telephone system to go temporarily into its night service mode so that incoming calls do not go unanswered. In a large system with ACD, it prevents the telephone system from directing calls to the unoccupied workstation. When the amplifier 6 is re-connected to the telephone system 16, the automatic log on/log off system 76 may cause the telephone system to reverse the action previously taken, or the occupant may have to log back in manually.

FIG. 1 shows a telephone system 16 with an automatic log on/log off system controlled by the current sensor 86 that detects whether or not the amplifier 6 is connected to the telephone system by monitoring the current drawn by the amplifier from the telephone system. Current from a power supply 81 in the telephone system is supplied to the conductor 21, and to the amplifier 6, through the current sensor 86. The current sensor 86 provides an output signal to the automatic log on/log off system 76. When the current supplied to the amplifier is greater than a threshold value, typically about one milliamp, the current sensor 86 provides an output signal in a first state that indicates that the amplifier is connected to the telephone system. When the current supplied to the amplifier is less than the threshold value, the current sensor provides an output signal in a second state that indicates that the amplifier has been disconnected from the telephone system. The state of the output signal from the current sensor thus informs the automatic log on/log off system 76 whether or not the amplifier 6 is connected to the telephone system 16, and the automatic log on/log off system can thus cause the telephone system to take appropriate action.

The connector 71 in the cord 51 between the amplifier 6 and the headset 46 enables the occupant to leave the workstation while continuing to wear his/her headset without having to disconnect the amplifier from the telephone system 16. This defeats the automatic log on/log off system. Because the current drawn from the telephone system 16 by the headset 46 is small compared with the total current drawn from the telephone system by the amplifier 6, it is not practical to change the threshold of the current sensor 86 to detect the change in the current drawn by the amplifier resulting from disconnecting the headset.

Figure 2:
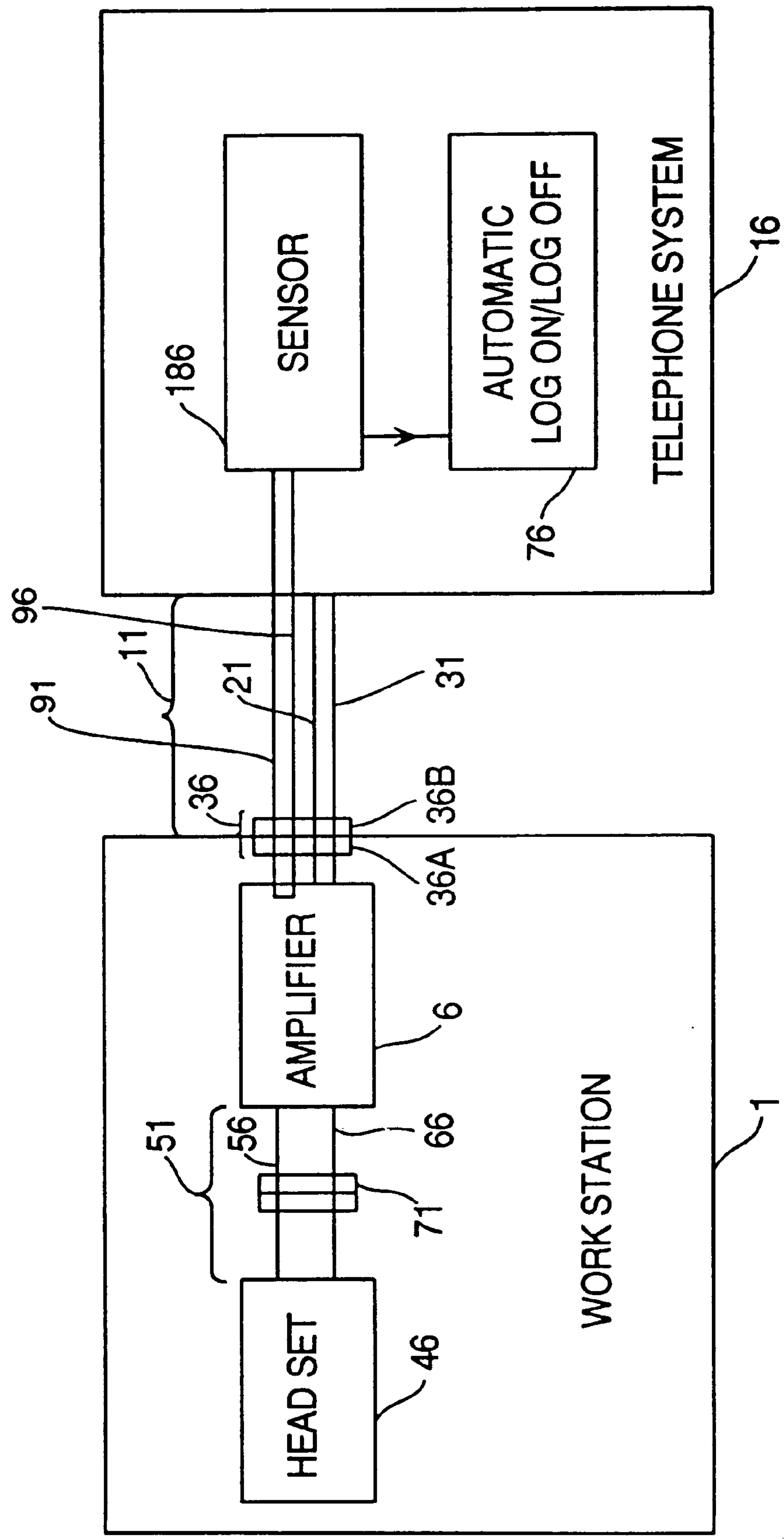
FIG. 2 is a block diagram of a telephone system with an automatic log on/log off system that determines whether or not the amplifier is connected by sensing the resistance or voltage difference between two additional contacts.

FIG. 2 shows the telephone system of FIG. 1 fitted with a known alternative to the current sensor 86 (FIG. 1) for determining whether or not the amplifier 6 is connected to the telephone system 11. The cord 11 is provided with two additional conductors 91 and 96. The conductors are interconnected on the amplifier side of the connector 36. Inside the telephone system 16, the additional conductors 91 and 96 are connected to the sensor 186, which measures a parameter relating to the two additional conductors that depends on whether the amplifier 6 is connected to the telephone system 16. This could be the resistance between the conductors, a voltage difference between the conductors, an a.c. signal level, or some other suitable parameter. The sensor 186 provides an output signal to the automatic log on/log off system 76.

When, for example, the resistance between the additional conductors 91 and 96 is less than a threshold value, the sensor 186 provides an output signal in a first state that indicates that the amplifier is connected to the telephone system. When the resistance between the conductors is greater than the threshold value, the sensor 186 provides an output signal in a second state that indicates that the amplifier has been disconnected from the telephone system. The state of the output signal of the sensor 186 thus indicates to the automatic log on/log off system 76 whether or not the amplifier 6 is connected to the telephone system 16, and the automatic log on/log off system can thus cause the telephone system to take appropriate action.

As a common alternative to the arrangement shown in FIG. 2, the additional conductors 91 and 96 can be connected to the contacts of a switch on the socket 36B. The contacts are actuated by plugging the plug 36A into the socket 36B. When the plug 36A (typically a ¼ inch phone jack) is not plugged into the socket 36B, the contacts are in first condition, e.g., open; when the plug 36A is plugged into the socket 36B, the contacts change to a second condition, e.g., closed.

As an alternative to providing two additional conductors 91 and 96, the additional conductor 96 can be omitted. The sensor 186 would then monitor a parameter relating to the single conductor 91 and one of the other conductors 21 and 31 of the cord 11 that depends on whether the amplifier 6 is connected to the telephone system 16. For example, the additional conductor 91 can be connected to the power/signal conductor 21 on the plug 36A of the connector 36, which is connected to the amplifier. The sensor 186 then determines whether or not the voltage on the additional conductor 91 is substantially the same as the amplifier power supply voltage.

The connector 71 in the cord 51 between the amplifier 6 and the headset 46 enables the occupant of the workstation to leave the workstation while continuing to wear his/her headset without having to disconnect the amplifier 6 from the telephone system 16. This defeats the automatic log on/log off system because it does not change any parameter relating to the additional conductors 91 and 96, or relating to the additional conductor 91 and another conductor in the cord 11.

Figure 3:
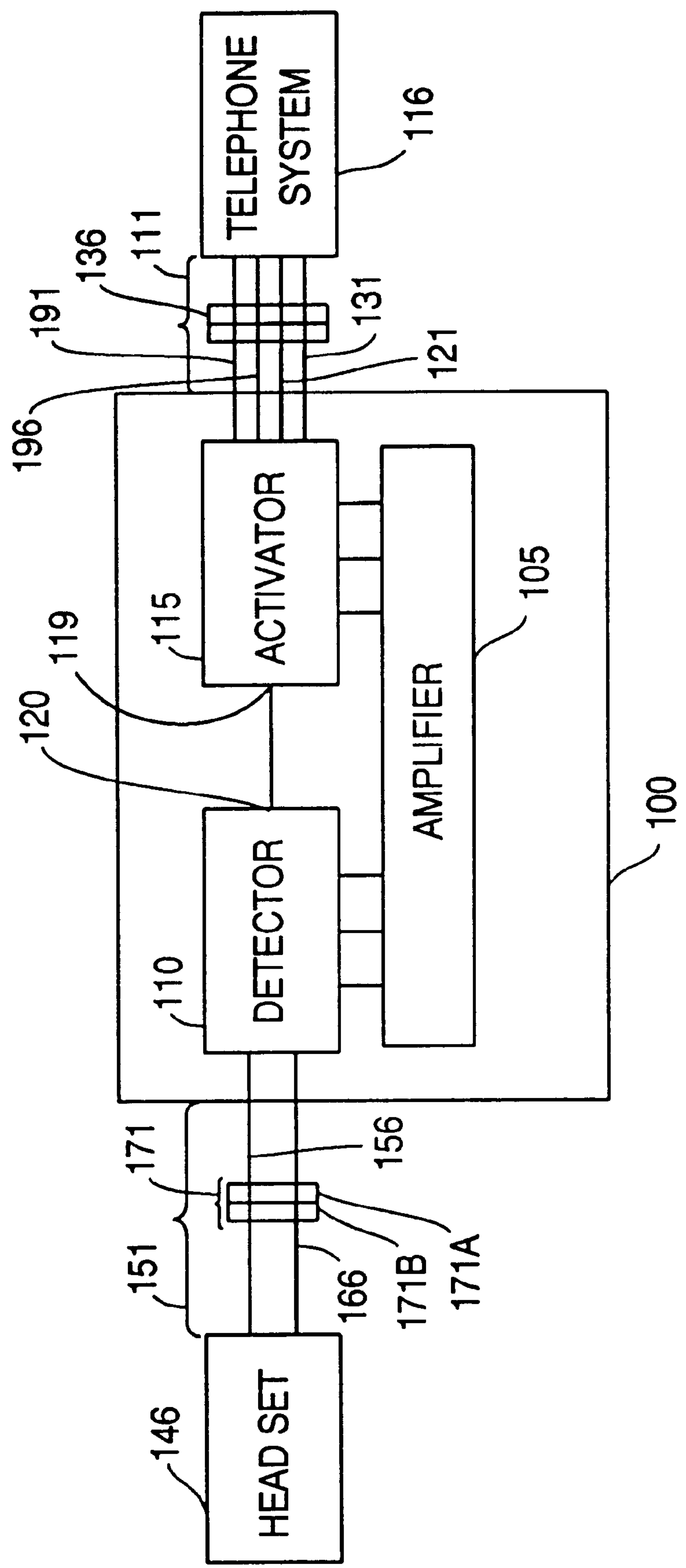
FIG. 3 is a block diagram of a headset amplifier with automatic log on/log off detection according to the invention connected between a headset and a telephone system.

FIG. 3 shows a block diagram of an amplifier 100 according to the invention. As in the known amplifiers shown in FIGS. 1 and 2, the amplifier 100 is connected to the headset 146 by the cord 151 that includes the connector 171, comprising the plug 171A and the socket 171B, and the two conductors 156 and 166 for power/signal and ground, respectively. The amplifier is connected to the telephone system by the cord 111 that includes the connector 136, comprising the plug 136A and the socket 136B, the two conductors 121 and 131 for power/signal and ground, respectively. The cord 111 may also include the additional conductors 191 and 196. The conductors in the cords 111 and 151 are directly or indirectly connected to the amplifier electronics 105, and provides the necessary interface between the headset 146 and the telephone system 116. The amplifier electronics 105 are known and consequently details of them will not be shown.

The amplifier 100 according to the invention additionally includes the detector 110, to which one or more of the conductors of the cord 151 are connected, and the activator 115, to which one or more of the conductors of the cord 111 are connected.

The detector 110 monitors one or more of the conductors of the cord 151 to determine whether or not the headset 146 is connected to the amplifier 100, i.e., to determine whether or not the workstation at which the amplifier 100 is located is occupied. The detector output 120 is connected to the control input 119 of the activator. The detector output 120 preferably provides a signal having one state when the headset is connected to the amplifier, and a second state when the headset is not connected to the amplifier.

The activator 115 activates the existing automatic log on/log off system in the telephone system 116 in response to the detector output 120. One or more of the conductors of the cord 111 are connected to the activator. Depending on the state of the output 120 of the detector 110, the activator makes it appear to the automatic log on/log off system in the telephone system as if the amplifier is connected to or disconnected from the telephone system. The action of the activator depends on what parameter the sensor controlling the automatic log on/log off system in the telephone system monitors to determine whether or not the amplifier is connected.

For example, an activator for use with the telephone system with the current sensing automatic log on/log off system shown in FIG. 1 changes the current drawn by the amplifier 100 from the telephone system 116 in response to the detector 110. When the detector indicates that the headset 146 is not connected to the amplifier 100, the activator 115 reduces the current drawn by the amplifier 100 to less than the threshold level of the current sensor 86 (FIG. 1) in the telephone system 116. When the amplifier draws less current than the threshold level of the current sensor, it appears to the current sensor, and hence to the automatic log on/log off system in the telephone system, as if the amplifier 100 has been disconnected from the telephone system. Accordingly, the automatic log on/log off system in the telephone system logs off the workstation to which the amplifier is connected.

Figure 4:
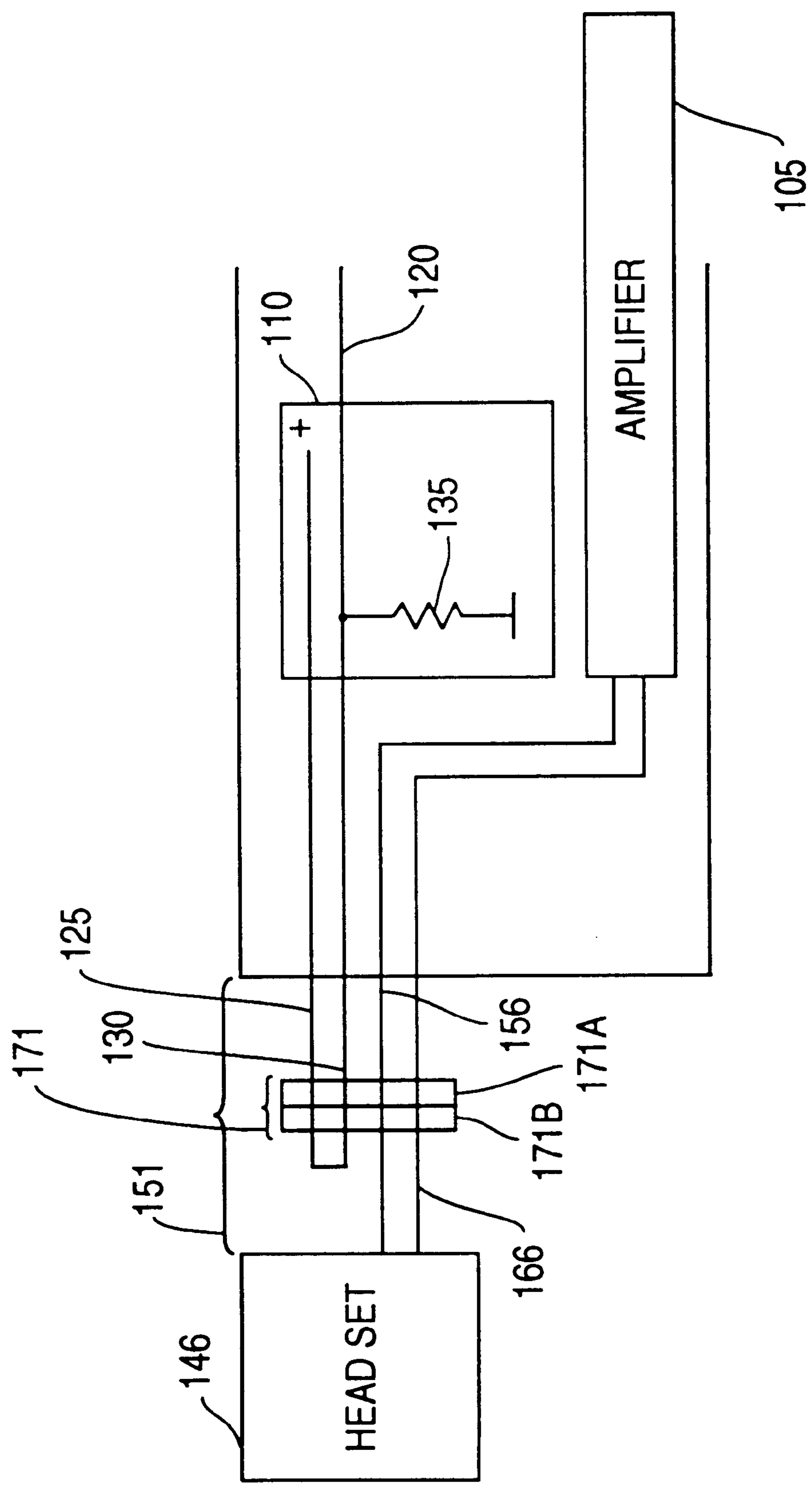
FIG. 4 is a schematic diagram of a first variation of the detector part of a headset amplifier with automatic log on/log off detection according to the invention in which the detector detects the voltage between two additional conductors in the headset cord.
Figure 5:
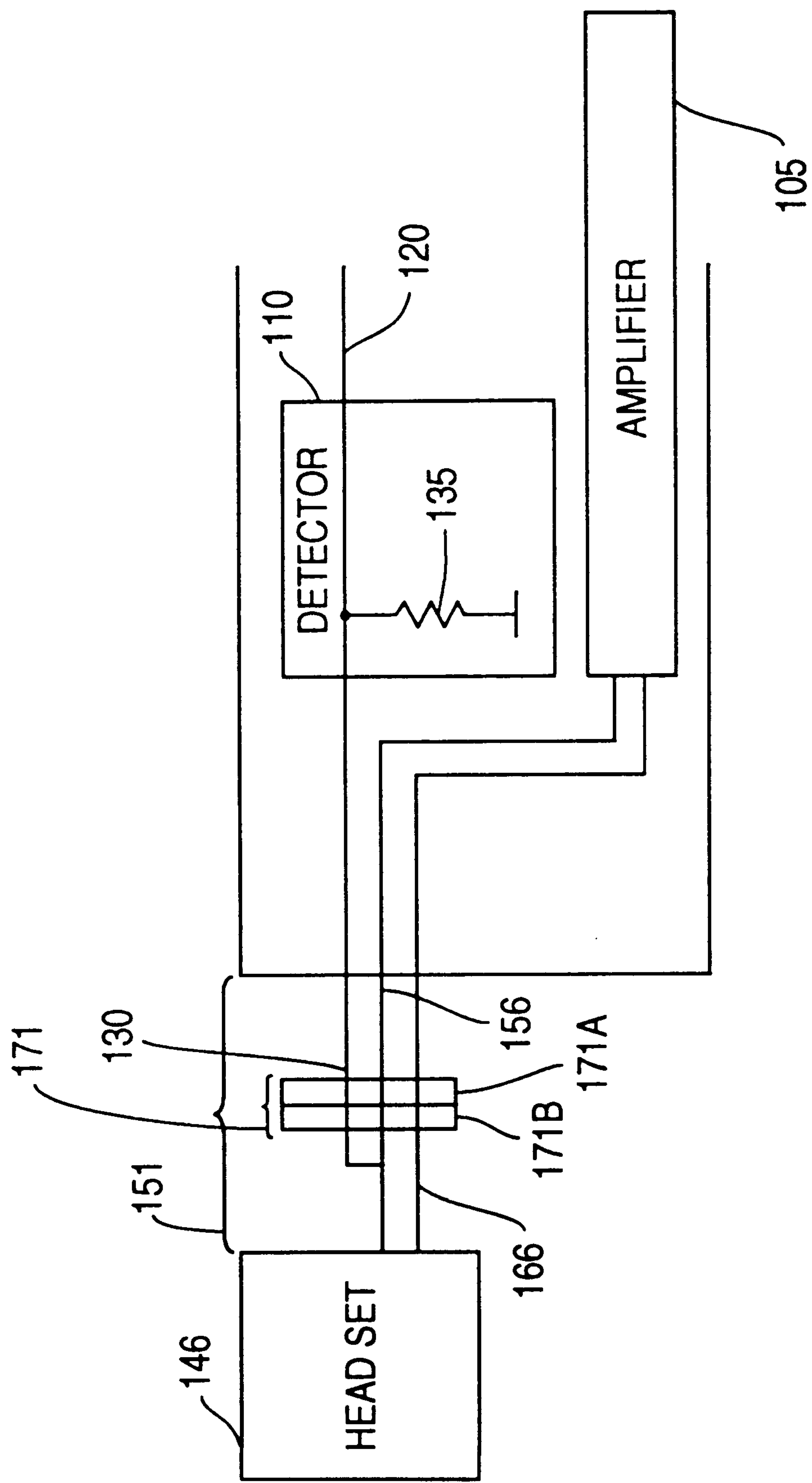
FIG. 5 is a schematic diagram of a second variation of the detector part of a headset amplifier with automatic log on/log off detection according to the invention in which the detector detects the voltage between one additional conductor and one of the existing conductors in the headset cord.
Figure 6:
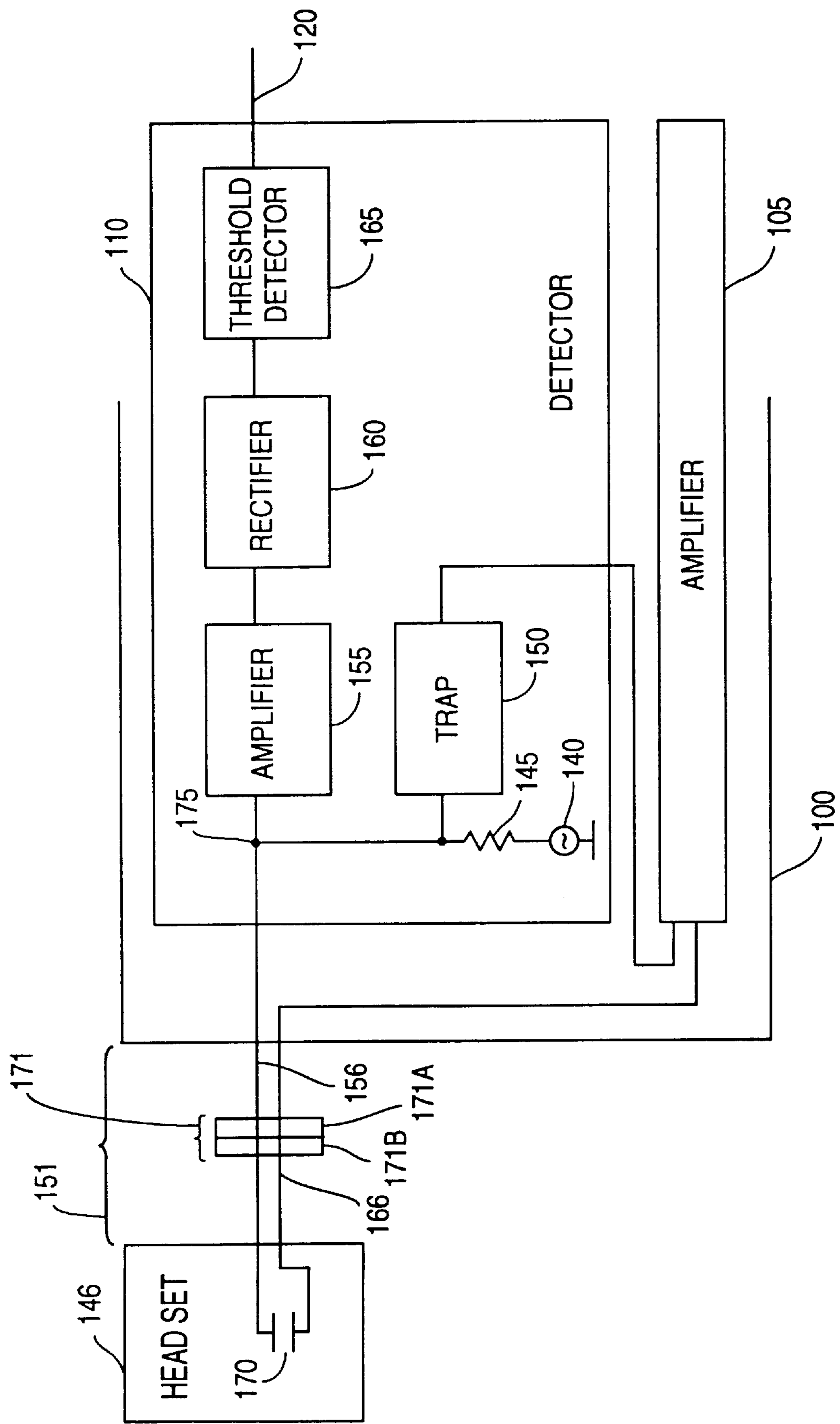
FIG. 6 is a block diagram of a third variation of the detector part of a headset amplifier with automatic log on/log off detection according to the invention in which the detector detects the level of a pilot signal superimposed upon one of the conductors in the headset cord.

FIGS. 4 through 6 show various examples of the detector 110. The activator 115, the telephone system 116, and the connections between them are omitted from FIGS. 4 through 6. A fourth, preferred, example of a detector is shown in FIG. 10. FIG. 4 shows a simple form of the detector 110. The cord 151 is provided with two additional conductors 125 and 130 between the amplifier 101 and the connector 171. The additional conductors 125 and 130 are connected to two additional pins on the socket 171A. The additional pins on the plug 171B corresponding to the additional pins on the socket 171A are connected together. The plug 171A is connected to the headset 146. When the headset is connected to the amplifier, the plug 171B mates with the socket 171A, and the interconnected additional pins in the plug 171B cause the resistance between the additional conductors 125 and 130 to be low. When the headset is not connected to the amplifier, the plug 171B is not mated with the socket 171A, and there is no connection between the additional conductors 125 and 130. Hence, the resistance between the additional conductors 125 and 130 is high.

The detector 110 can measure the resistance between the additional conductors 125 and 130 directly using known techniques. In an alternative way of measuring the resistance between the additional conductors 125 and 130, the conductor 125 is connected to the power supply of the amplifier, i.e., to the conductor 121 (FIG. 2). The conductor 130 is held at ground potential by the resistor 135, and provides the detector output 120. When the headset is connected, the conductor 130, and hence the detector output 120, is substantially equal to the amplifier power supply voltage. When the headset is not connected, the resistor 135 holds the voltage on the conductor 130, and hence the detector output 120, substantially at ground potential. Amplification, buffering, and inversion can be applied to the detector output 120 if necessary.

FIG. 5 shows an alternative simple form of the detector 110. The cord 151 is provided with one additional conductor 130 between the amplifier 101 and the socket 171A. The conductor 130 is connected to an additional pin on the socket 171A. An additional pin on the plug 171B, to which the headset 146 is connected, corresponding to the additional pin on the socket 171A is connected to one of the other pins on the plug 171B. In FIG. 5, the additional pin on the plug 171B is connected to the pin connected to the conductor 156, which carries the power supply for the headset 146. The additional pin in the plug 171B can also be connected to the pin in the plug connected to the conductor 166, which carries the ground connection to the headset if the detection scheme shown in FIG. 5 is inverted. The additional pin in the plug 171B could even be connected to the pin in the plug connected to one of the receive conductors (not shown) if a detection scheme different from that shown in FIG. 5 is used.

When the headset 146 is connected to the amplifier 100, the plug 171B is mated with the socket 171A, which connects the additional conductor 130 to the power supply because of the connection between the pin connected to the conductor 156 (the power supply/signal conductor) and the additional pin in the plug 171B. When the headset is not connected to the amplifier, the plug 171B is not mated with the socket 171A, and there is no connection between the additional conductor 130 and the power supply, and the additional conductor floats. The resistor 135 between the conductor 130 and ground holds the conductor 130 substantially at ground potential when the headset is not connected to the amplifier, and enables the voltage on the conductor 130 to serve as the detector output 120.

The additional conductors 125 and 130, or the additional conductor 130 and one of the conductors 156 or 166, can be connected to the contacts of a switch (not shown) fitted to the socket 171A. The switch is actuated by plugging the plug 171B into the socket.

FIG. 6 shows a form of the detector 110 that does not require additional conductors to be added to the cord 151. The detector monitors the conductor 156 that carries the power supply/signal to the headset 146. The oscillator 140 imposes a low-level alternating voltage onto the conductor 156 through the impedance 145 (a resistor is shown). The trap 150 isolates the alternating voltage from the headset power supply and the transmit signal input (not shown) of the amplifier electronics 105. The alternating voltage on the conductor 156 is amplified by the amplifier 155, and rectified and smoothed by the rectifier 160. The resulting DC voltage is fed into the threshold detector 165, which provides the detector output 120. A capacitor 170 is connected between the conductor 156 and the ground conductor 166 in the cord 151 somewhere between the plug 171B, to which the headset 146 is connected, and the headset 146. FIG. 6 shows the capacitor 170 located in the headset. It can also be located in the plug 171B, or be built into the cord 151 between the headset 146 and the plug 171B.

When the headset 146 is not connected to the amplifier 100, the alternating voltage at the node 175 is substantially equal to the output voltage of the oscillator 140. Circuit parameters are chosen to make the resulting DC voltage at the output of the rectifier 160 greater than the threshold voltage of the threshold detector 165. At the frequency of the alternating signal, the impedance of the capacitor 170 is comparable with the resistance of the resistor 145, so that when the headset 146 is connected to the amplifier 100, the attenuator formed by the capacitor 170 and the resistor 145 reduces the level of the alternating voltage at the node 175. Circuit parameters are chosen to make the resulting DC voltage at the output of the rectifier 160 less than the threshold voltage of the threshold detector 165. Thus, the output of the threshold detector changes state depending on whether the headset is connected to the amplifier.

If the frequency of the alternating signal is close to the audio frequency band, the arrangement shown in FIG. 6 should be modified by replacing the capacitor 170 by a serial arrangement of an inductor and a capacitor that is resonant at the frequency of the alternating signal. The resonant circuit has a low impedance at the alternating signal frequency, and thus attenuates the signal level at the node 175, but presents a relatively high impedance to the audio signal present on the conductor 156.

The detector 110 may monitor the conductors in the cord 151 in additional ways to determine whether or not the headset 146 is connected to the amplifier 110.

FIG. 3 shows the activator 115 is connected to at least one of the conductors of the cord 111 between the amplifier 100 and the telephone system 116. In response to the detector output 120, the activator 115 activates the existing automatic log on/log off system in the telephone system 116 by emulating the effect of disconnecting the amplifier from the telephone system. The activator 115 includes a controlled switch that is responsive to the detector output. The controlled switch in the activator switches the parameter that the sensor in the automatic log on/log off system in the telephone system monitors to determine whether or not the amplifier is connected to the telephone system.

Figure 7:
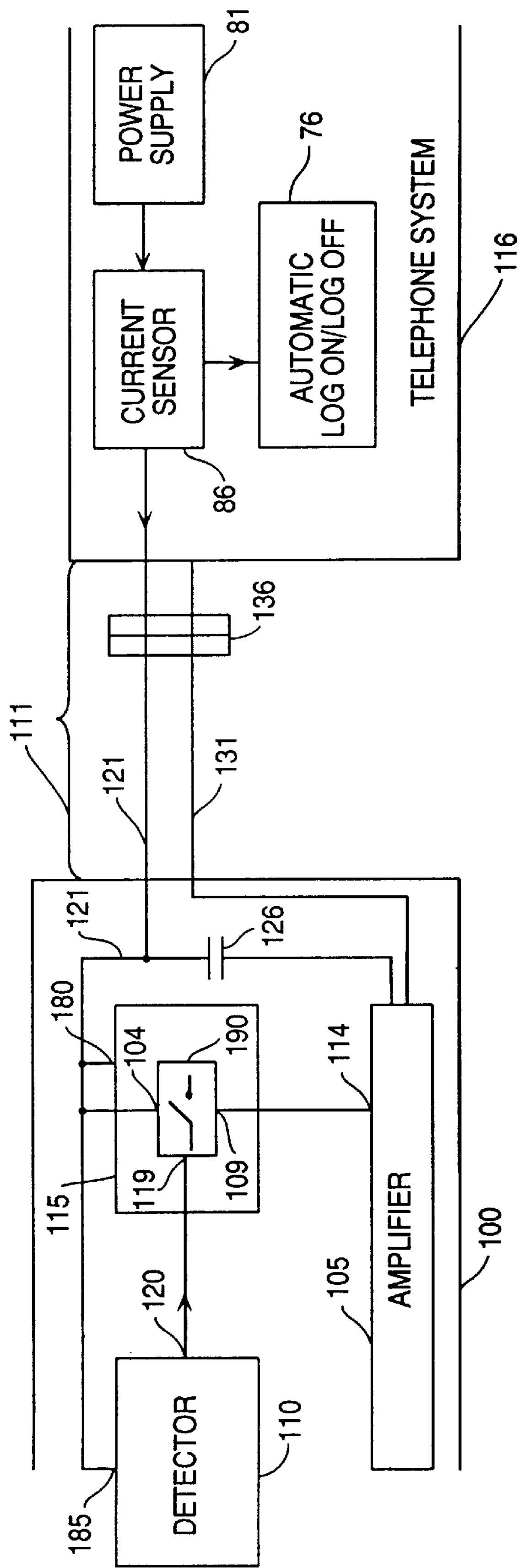
FIG. 7 is a block diagram of the activator part of a headset amplifier with automatic log on/log off detection according to the invention in which the activator activates a current sensing type of automatic log on/log off system.

A version of the amplifier 100 for use with a telephone system having an automatic log on/log off system having a current sensor that senses the current drawn by the amplifier from the telephone system is shown in FIG. 7. In FIG. 7 the ground conductor 131 is connected directly from the telephone system 116 to the amplifier electronics 105. The conductor 121 is connected to the power supply input connections 180 and 185 of the activator 115 and the detector 110, respectively. The capacitor 126 couples the transmit output of the amplifier electronics to the power supply/signal conductor 121.

The conductor 121 is also connected to one of the switched terminals 104 of the controlled switch 190 in the activator 115. The other switched terminal 109 of the controlled switch is connected to the power supply input terminal 114 of the amplifier electronics 105. The detector output 120 is connected to the control input terminal 119 of the controlled switch.

The controlled switch 190 can be a relay, a transistor, an opto-relay or any other suitable switching device that can be controlled by a suitable control signal.

When detector output 120 is in one of its states, the controlled switch 190 is in its ON (conducting) state, and when the detector output 120 is in the other of its states, the controlled switch 190 is in its OFF (non-conducting) state. When the controlled switch is in its ON state, the amplifier electronics 105 draw current from the conductor 121 (and hence from the telephone system) through the controlled switch. To the current sensor 86 in the telephone system 116 that monitors the flow of current through the conductor 121, this appears the same as if the amplifier 100 were connected to the telephone system. When the controlled switch is in its OFF state, the amplifier electronics 105 draw no current from the conductor 121. To the current sensor 86 in the telephone system that monitors the flow of current through the conductor 121, this appears the same as if the amplifier 100 were disconnected from the telephone system. Thus, by controlling the current drawn from the telephone system 116 by the amplifier 100, the controlled switch 190 is able to control the automatic log on/log off system in the telephone system.

When the controlled switch 190 is in its OFF state, the detector 110 and the activator 115 continue to draw current from the telephone system 116. These circuits must therefore be designed such that together they draw significantly less current than the threshold current level of the current sensor 86 in the telephone system. The current drawn by the detector and the activator must be minimized especially when the controlled switch is in its OFF state, i.e., when the headset 146 is disconnected. For example, if a relay is used for the controlled switch 190, the normally-open contacts of the relay should be used to provide the switched contacts 104 and 109 so that the relay does not draw current in its OFF state.

As an alternative to switching the power supply to the amplifier electronics 105, the controlled switch 190 can switch the ground connection to the amplifier electronics. This enables an NPN transistor to be used for the controlled switch.

If the current sensor 86 controlling the automatic log on/log off system in the telephone system has a very low threshold, the detector 110 and the activator 115 should be connected to a power source that is not sensed by the current sensor 86 in the telephone system.

Figure 8:
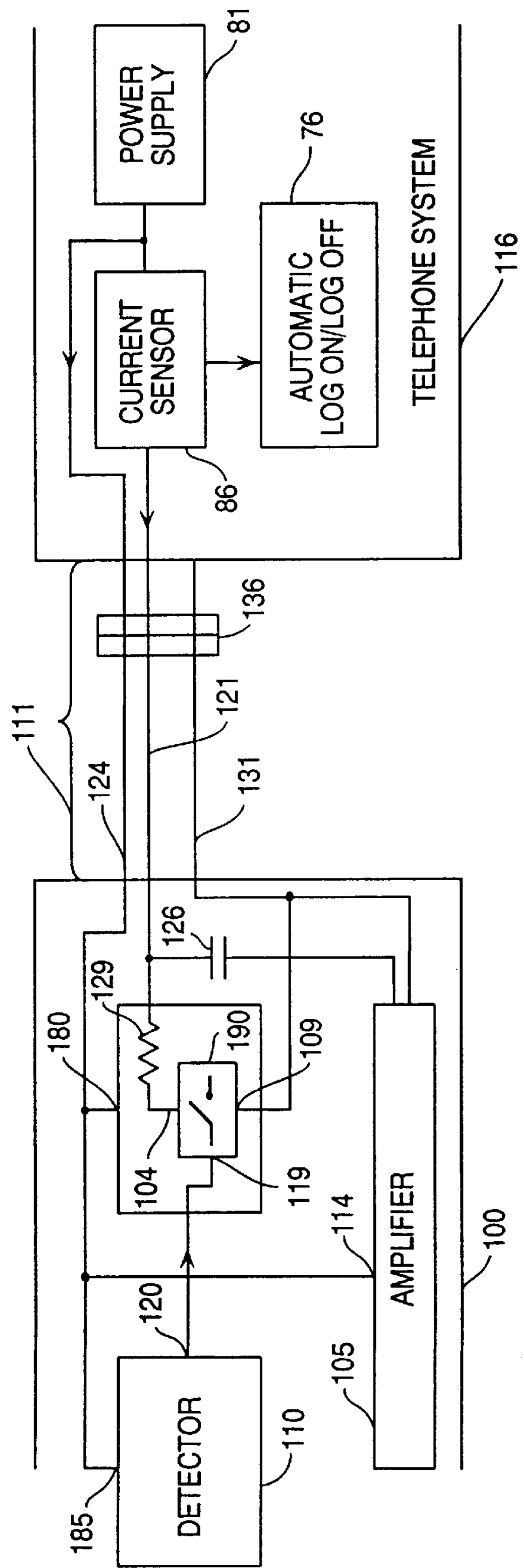
FIG. 8 is a block diagram of the activator part of a headset amplifier with automatic log on/log off detection according to the invention in which the activator activates a current sensing type of automatic log on/log off system with a low current sensing threshold.

Alternatively, the detector 110, the activator 115, and the amplifier electronics 105 all can be powered from a power source that is not sensed by the current sensor 86 in the telephone system 116, as shown in FIG. 8. An additional conductor 124 is added to the cord 111. In the amplifier, the conductor 124 is connected to the power supply input terminals 185, 180, and 114 of the detector, the activator, and the amplifier electronics 105, respectively. The conductor 124 is connected directly to the power supply 81 in the telephone system, bypassing the current sensor 86. Alternatively, the additional conductor 124 can be dispensed with, and the amplifier 100 can be provided with its own internal DC power supply powered from the a.c. line.

In versions of the amplifier 100 in which the power supply to the amplifier electronics is not switched, a load resistor 129 is connected between the conductor 121, carrying the power supply current that is sensed by the current sensor 86, and one of the switched terminals 104 of the controlled switch 190. The other switched terminal 109 of the controlled switch is connected to the conductor 131 that carries the ground connection. The control input terminal 119 of the controlled switch is connected to the detector output 120. The value of the load resistor 129 is chosen so that when the controlled switch 190 is in its ON state, the current through the conductor 121, and hence through the current sensor 86, is well above the threshold current of the current sensor 86. This arrangement has the following advantages: an NPN transistor with a suitable current rating can be used for the controlled switch 190; the current drawn from the conductor 121 can be made completely independent of the current requirements of the amplifier 100; and the amplifier electronics 105 remain powered when the headset 146 is disconnected, which avoids unpleasant and potentially harmful transients in the earphone of the headset when the headset is reconnected.

A version of the activator 115 for use with a telephone system having an automatic log on/log off system that senses the change in resistance between two additional conductors in the cord 111 is shown in FIG. 9. In FIG. 9, the conductors 121, carrying the positive power supply, and 131, carrying the ground connection, are connected from the telephone system 116 to the amplifier electronics 105. The additional conductors 191 and 196 in the cord 111 are connected to the switched terminals 104 and 109 of the controlled switch 195. The control input terminal 119 of the controlled switch 195 is connected to the detector output 120.

When the detector output 120 is in one of its states, the controlled switch 195 is in its ON (conducting) state, and when the detector output is in the other of its states, the controlled switch 195 is in its OFF (non-conducting) state. When the controlled switch is ON, the conductor 191 is connected to the conductor 196 which, to the sensor 102 in the telephone system 116 appears the same as the amplifier being connected to the telephone system. When the controlled switch is OFF, the conductor 191 is not connected to the conductor 196 which, to the sensor in the telephone system appears the same as the amplifier not being connected to the telephone system. Thus, controlling the resistance between the conductors 191 and 196 by the controlled switch 195 activates the automatic log on/log off system in the telephone system.

When the telephone system has an automatic log on/log off system that senses the resistance or voltage between the contacts of a switch mounted on the socket 136B, the switch being operated by plugging the plug 136A into the socket, the additional conductors 191 and 196 must be connected either in series or in parallel with the switch, depending on the operating sense of the switch. Thus, if the switch is open when the plug 136 is plugged in, the additional conductors 191 and 196 must be connected in parallel with the switch. If the switch is closed when the plug 136 is plugged in, the additional conductors 191 and 196 must be connected in series with the switch.

The controlled switch 195 can be a relay, a transistor, an opto-relay or any other suitable switching device that can be controlled by a suitable control signal. Preferably, the controlled switch is of the type that has switched contacts that are isolated from the control terminal so that the amplifier can used with telephone systems having any type of automatic log on/log off sensor.

FIG. 10 shows the preferred embodiment of the amplifier according to the invention. The preferred embodiment of the invention is for use with a headset that includes an electret microphone 103 that draws a small DC current from the amplifier 100 through the power supply/signal conductor 156. The detector 110 monitors the current in the conductor 156 and detects the change in DC current that occurs when the headset is disconnected from the amplifier, and the microphone no longer draws current. The current in the conductor 156 monitored by the detector 110 is about one hundredth of the current in the conductor 121 monitored by the sensor 86 in the current sensing automatic log on/log off system in the telephone system shown in FIG. 1.

The headset 146 is connected to the amplifier 100 with the cord 151 that is interrupted by the plug 171B and the socket 171A that comprise the connector 171. The cord 151 includes the power supply/signal conductor 156 and the ground conductor 166, both of which are connected to the amplifier electronics 105 in the amplifier 100. The cord 151 may be detachably connected to the amplifier 100 with a suitable connector (not shown) mounted on the amplifier.

Mounted on the amplifier 100 is the socket 108A, which, together with the plug 108B, forms the connector 108. The power supply/signal conductor 221 is connected between a pin on the socket 108A and the power supply input terminals 185, 180, and 183 of the detector 100, the activator 115, and the microphone power supply 123, respectively. The ground conductor 231 is connected between a pin on the socket 108B and the amplifier electronics 105 and the detector 110. The additional conductors 291 and 296 are connected between the pins of the socket 108A and the activator 115. The capacitor 126 couples the transmit output of the amplifier electronics 105 to the power supply/signal conductor 221.

The interconnect 113 connects the socket 108A on the amplifier 100 to the existing socket 136B on the workstation 1. Pins on the socket 136B are connected to the telephone system 116 by the conductors 321 for the power supply/signal, 331 for ground, and, optionally, depending on what type of automatic log on/log off system sensor used by the telephone system, the additional conductors 391 and 396.

The interconnect 113 includes the plug 108B, which plugs into the socket 108A on the amplifier 100, the cord 118, and the plug 136A, which plugs into the socket 136B. The cord includes the conductors 121 for the power supply/signal, 131 for ground, and the additional conductors 191 and 196. Choosing the appropriate type of interconnect 113 from a number of available types of interconnect enables the same amplifier 100 to be connected to a variety of different telephone system workstations. Each type of interconnect has the same plug 108B, but, depending on the workstation to which it is designed to be connected, each type can have a cord 118 with a different number of conductors, a different plug 136A, and the conductors of the cord 118 can be connected to different pins on the plug 136A.

In the amplifier 100, the amplifier electronics 105 include the power supply 123, which produces a DC voltage suitable for powering the electret microphone 103 in the headset 146 from the power supply brought into the amplifier from the telephone system 116. The voltage from the telephone system is in the range of 3 to 12 volts and the voltage required for the electret microphone is about 1.2 volts. The DC output of the power supply 123 is connected through the resistor 128 to the conductor 156, and hence to the microphone 103. When the microphone picks up speech, it draws a varying current from the power supply 123. The resulting variations in the voltage at the end of the resistor 128 remote from the power supply 123 are coupled by the capacitor 133 to a microphone amplifier (not shown) in the amplifier electronics 105. In the amplifier 100 according to the invention, the power supply input terminal 183 of the power supply 123 is connected directly to the conductor 221, instead of to the power supply connection 114 of the amplifier electronics 105. The power supply 123 must be designed so that it draws minimal current when the headset is disconnected. This is so that the amplifier can be used with telephone systems having a current sensing automatic log on/log off system with a low current sensing threshold.

The output of the power supply 123 is also connected to the detector 110, where is it divided by the potential divider formed by resistors 138 and 143. The ratio of the values of resistors 138 and 143 is such that the voltage at the junction of the resistors is about 50 millivolts less than the output voltage of the power supply 123. This voltage difference may be reduced if a microphone drawing less than about 40 microamps is used.

The junction of the resistors 138 and 143 is connected to the inverting input of the comparator 148. The non-inverting input of the comparator 148 is connected to junction of the resistor 128 and the capacitor 133. The output of the comparator 148 provides the detector output 120. The comparator 148 is powered by the power supply voltage on the conductor 221, through suitable decoupling (not shown), if necessary. A suitable integrated circuit comparator can be used for the comparator 148. Alternatively, a suitable high-gain integrated circuit operational amplifier can be used. The comparator should draw a low standing current because the detector 110 draws current when the headset is disconnected. Using a comparator with a low standing current enables the amplifier to be used with telephone systems having a current sensing automatic log in/log out system with a low current sensing threshold. In the preferred embodiment, one-half of a TLC 25L2 dual low-power operational amplifier made by Texas Instruments is used for the comparator 148.

When the headset 146 is connected to the amplifier 100, and the microphone 103 draws current from the power supply 123 through the resistor 128 and the conductor 156, the current drawn by the microphone causes a voltage drop across the resistor 128 of greater than 50 mV. Consequently, the voltage at the junction of the resistor 128 and the capacitor 133 is more than 50 mV below the output voltage of the power supply 123. This means that the voltage on the non-inverting input of the comparator 148 is lower than the voltage on the inverting input, and the output of the comparator, i.e., the detector output 120, is substantially at ground potential.

When the headset is disconnected from the amplifier 100 by parting the connector 171, the microphone 103 no longer draws current through the resistor 128. As a result, there is substantially no voltage drop across the resistor 128, and the voltage on the non-inverting input of the comparator 148 is higher than the voltage on the inverting input. The voltage on the output of the comparator, i.e., the detector output 120, is substantially equal to the voltage of the positive power supply on the conductor 221. The detector output 120 thus depends on whether or not the headset 146 is connected to the amplifier.

In the preferred embodiment of the amplifier according to the invention shown in FIG. 10, the activator 115 includes two controlled switches. The first controlled switch 190 controls the current that the amplifier draws from the conductor 221 (and hence from the conductor 321 in the telephone system), and the second controlled switch 195 switches two isolated contacts. The control input terminal 119 of the activator 115 receives the output 120 from the detector 110. The current drawn from the conductor 221 by the amplifier 100 is switched by connecting the conductor 221 and the power supply terminal 114 of the amplifier electronics 105 to the switched terminal 104 and 109 respectively of the controlled switch 190. In the controlled switch 190, the emitter of the PNP transistor 153 is connected to the switched terminal 104 and the collector of the transistor 153 is connected to the switched terminal 109. The base of the transistor 153 is connected to the control input terminal 119 of the activator 115, and thence to the detector output 120, through the resistor 158. A resistor 163 may be connected between the base and the emitter of the transistor 153 if desired. Suitable amplification, buffering, and inversion may be connected between the control terminal input 119 and the transistor 153 if necessary.

When the headset 146 is disconnected from the amplifier 100, the voltage on the detector output 120 is close to the power supply voltage on the conductor 221. No current flows from base of the transistor 153 through the resistor 158 into the comparator 148, and the transistor 153 is OFF. Consequently, the amplifier electronics 105 draw no current from the conductor 221, and hence from the telephone system 116. The only current drawn from the telephone system 116 is the current drawn by the detector 110 and the power supply 123, which is small compared with the current drawn by the amplifier electronics 105. Neither the activator shown nor the amplifier electronics 105 draws current.

When the headset 146 is connected to the amplifier 100, the voltage on the detector output 120 is low, and current flows from base of the transistor 153, through the resistor 158, and into the comparator 148, turning the transistor 153 ON. This connects the amplifier electronics 105 to the conductor 221, and allows the amplifier electronics 105 to draw current from the conductor 221, and hence from the telephone system 116. The total current drawn from the telephone system 116 is equal to the current drawn by the detector 110, the activator 115, the power supply 123 and the amplifier electronics 105.

The activator 115 causes the current drawn from the telephone system 116 when the headset is connected to be considerably greater than that drawn when the headset is disconnected. The change in current drawn from the telephone system is sufficiently great to activate the current sensing automatic log on/log off system in the telephone system 116. Moreover, the change in current drawn from the telephone system along the conductor 321 causes a corresponding change in the current returned to the telephone system along the ground conductor 331. Thus, the activator 115 will also activate an automatic log on/log off system that senses the current in the ground conductor 331.

To enable a single amplifier to be used with telephone systems having both current sensing and resistance/voltage sensing automatic log in/log out systems, the preferred embodiment of the amplifier includes the second controlled switch 195 in the activator 115. The second controlled switch 195 is preferably an opto-isolator. A relay can also be used for the controlled switch 195, especially if a relay is used for the first controlled switch 190, since a second pair of switched contacts on the same relay can provide the second controlled switch 195. Finally, the second controlled switch 195 can be provided by some other form of controlled switch.

The switched terminals 134 and 139 of the second controlled switched are connected by the conductors 290 and 295 respectively to pins on the socket 108A on the amplifier 100, and thence, via the conductors 190 and 195 in the cord 118, and the conductors 390 and 395 to the automatic log on/log off detector (not shown) in the telephone system 116. The switched terminals 134 and 139 are connected to the collector and emitter, respectively, of the phototransistor 168 of the opto-coupler. The anode of the photodiode 173 of the optocoupler is connected to the power supply terminal 180 of the activator; the cathode of the photodiode 173 is connected through the resistor 178 to the control input terminal 119 of the activator, and thence to the detector output 120.

When the headset 146 is connected to the amplifier 100, the voltage on the detector output 120 is low, and current flows through the photodiode 173 and the resistor 188 into the comparator 148. The photodiode 178 illuminates the phototransistor 168, turning the phototransistor 168 ON. This produces a low impedance between the switched terminals 134 and 139, and hence between the conductors 191 and 196. To a resistance/voltage sensing automatic log on/log off system in the telephone system 116 this low resistance appears the same as if the amplifier were connected to the workstation 1. Accordingly, the automatic log on/log off system will automatically log the occupant of the workstation on.

When the headset 146 is not connected to the amplifier 100, the voltage on the detector output 120 is high, and no current flows through the photodiode 173 and the resistor 188 into the comparator 148. The photodiode 178 does not illuminate the phototransistor 168, and the phototransistor 168 is OFF. This produces a high impedance between the switched terminals 134 and 139, and hence between the conductors 190 and 195. To a resistance/voltage sensing automatic log on/log off system in the telephone system 116 this appears as if the amplifier were disconnected from the workstation 1. Accordingly, the automatic log on/log off system will log the occupant of the workstation off.

The ability of the amplifier according to the invention to work with telephone systems having different types of automatic log on/log off systems by using a different interconnect 213 is shown in FIG. 11. The telephone system 216 is connected to the socket 236B on the workstation 1 by a three-wire cord that includes the conductors 321 and 331 for power/signal and ground, respectively, and the additional conductor 391. The automatic log on/log off system in the telephone system 216 senses whether the additional conductor 391 is at the same potential as the positive supply conductor 321.

The interconnect 213 enables the amplifier 100, which is the same as the amplifier shown in FIG. 10, to operate the automatic log on/log off system of the telephone system 216, which is different from the automatic log on/log off system in the telephone system 116 shown in FIG. 10. The interconnect 213 has the plug 108B that plugs into the socket 108A on the amplifier 100, and the plug 236A that is of the correct type to mate with the socket 236B on the workstation 1. The cord 118 has the conductors 121 and 131 for power supply/signal and ground, respectively, and the additional conductors 191 and 196, as in FIG. 10. The additional conductors 191 and 196 are connected through the connector 108 to the switched contacts 134 and 139, respectively, of the second controlled switch 195 in the activator 115.

So that the second controlled switch 195 can change the voltage on the additional conductor 391, the interconnect 218 includes a link 183 between the conductor 121 carrying the positive supply voltage and the additional conductor 196. The link is shown mounted on the plug 236A, but it could alternatively be mounted on the plug 108B, or in the cord 118 between the plug 108B and the plug 136A.

When the second controlled switch 195 is ON, the additional conductor 191 is connected to the additional conductor 196, which is at the potential of the positive supply voltage. When the second controlled switch is OFF, the additional conductor 191 is at a voltage different from the voltage of the positive supply. The second controlled switch 195, together with the appropriate interconnect 218, controls the potential on the additional conductor 191 in such a way as to activate the voltage sensing automatic log on/log off system of the telephone system 216.

We claim:

1. An amplifier for connection to a telephone system which includes monitoring means for monitoring when a peripheral device is connected thereto and detecting a change in a parameter which occurs when the peripheral device is disconnected from the telephone system, wherein a communication link is established between the amplifier and a telephone headset for conveying signals between the telephone headset and the telephone system, the amplifier comprising:

detecting means for detecting an interruption of the communication link between the telephone headset and the amplifier and generating an output signal in response thereto; and activating means for receiving the output signal and in response thereto changing the parameter in a manner which emulates the disconnection of the peripheral device from the telephone system even though the amplifier remains connected to the telephone system.

2. The amplifier of claim 1, wherein the parameter is a current.

3. The amplifier of claim 1, wherein the parameter is a resistance.

4. The amplifier of claim 1, wherein the monitoring means of the telephone system is additionally for detecting a change in the parameter which occurs when the peripheral device is reconnected to the telephone system, and wherein:

the detecting means is additionally for detecting when the communication link is reestablished between the telephone headset and the amplifier and for generating an additional output signal in response thereto; and the activating means is additionally for changing the parameter in response to the additional output signal in a manner that emulates the reconnection of the peripheral device to the telephone system even though the amplifier has not been disconnected.

5. The apparatus of claim 1, wherein the monitoring means of the telephone system is additionally for detecting a change in the parameter which occurs when the peripheral device is reconnected to the telephone system, and wherein:

the detecting means generates the output signal in a first state when the communication link between the telephone headset and the amplifier is interrupted;

the activating means operates in response to the first state of the output signal to change the parameter in a manner that emulates the disconnection of the peripheral device from the telephone system even though the amplifier remains connected;

the detecting means is additionally for detecting when the communication link is reestablished between the telephone headset and the amplifier and for generating the output signal in a second state in response thereto; and the activating means is additionally for changing the parameter in response to the second state of the output signal in a manner that emulates the reconnection of the peripheral device to the telephone system even though the amplifier has not been disconnected.

6. The amplifier of claim 1, wherein:

the parameter is a current drawn from the telephone system;

the amplifier further comprises current drawing means for drawing current from the telephone system; and the activating means changes the current drawn from the telephone system by the current drawing means.

7. The amplifier of claim 6, wherein the monitoring means of the telephone system is additionally for detecting a change in the parameter which occurs when the peripheral device is reconnected to the telephone system, and wherein:

the detecting means is additionally for detecting when the communication link is reestablished between the telephone headset and the amplifier and generating an additional output signal in response thereto; and the activating means is additionally for changing the parameter in response to the additional output signal in a manner that emulates the reconnection of the peripheral device to the telephone system even though the amplifier has not been disconnected.

8. The apparatus of claim 6, wherein the monitoring means of the telephone system is additionally for detecting a change in the parameter which occurs when the peripheral device is reconnected to the telephone system, and wherein:

the detecting means generates the output signal in a first state when the communication link between the telephone headset and the amplifier is interrupted;

the activating means changes the parameter in response to the first state of the output signal in a manner that emulates the disconnection of the peripheral device from the telephone system even though the amplifier remains connected;

the detecting means is additionally for detecting when the communication link is reestablished between the telephone headset and the amplifier and for generating the output signal in a second state in response thereto; and the activating means is additionally for changing the parameter in response to the second state of the output signal in a manner that emulates the reconnection of the peripheral device to the telephone system even though the amplifier has not been disconnected.

9. The amplifier of claim 6, wherein the current drawn from the telephone system by the current drawing means is greater when the communication link is established between the telephone headset and the amplifier than when the communication link between the telephone headset and the amplifier is interrupted.

10. The amplifier of claim 6, wherein the activating means comprises a controlled switch including:

a first switched contact connected to a conductor through which the amplifier draws current;

a second switched contact connected to the current drawing means; and a control input terminal receiving the detector output signal.

11. The amplifier of claim 6, wherein the current drawing means comprises a resistor.

12. The amplifier of claim 1, wherein the detecting means is responsive to a signal communicated between the amplifier and the telephone headset.

13. The amplifier of claim 12, wherein the detecting means includes:

generator means for generating a voltage substantially proportional to the signal communicated between the amplifier and the telephone headset; and comparator means for comparing the voltage with a reference voltage and providing the output signal.

14. The amplifier of claim 1, wherein:

the parameter is a resistance between a first conductor and a second conductor;

the activating means comprises a controlled switch which includes a first switched contact coupled to the first conductor and a second switched contact coupled to the second conductor with a resistance between the first and second switched contacts; and the resistance between the first and second switched contacts changes in response to the output signal.

15. The amplifier of claim 14, wherein the monitoring means of the telephone system is additionally for detecting a change in the parameter which occurs when the peripheral device is reconnected to the telephone system, and wherein:

the detecting means is additionally for detecting when the communication link is reestablished between the telephone headset and the amplifier and for generating an additional output signal in response thereto; and the activating means is additionally for changing the parameter in response to the additional output signal in a manner that emulates the reconnection of the peripheral device to the telephone system even though the amplifier has not been disconnected.

16. The apparatus of claim 14, wherein the monitoring means of the telephone system is additionally for detecting a change in the parameter which occurs when the peripheral device is reconnected to the telephone system, and wherein:

the detecting means generates the output signal in a first state when the communication link between the telephone headset and the amplifier is interrupted;

the activating means changes the parameter in response to the first state of the output signal in a manner that emulates the disconnection of the peripheral device from the telephone system even though the amplifier remains connected;

the detecting means is additionally for detecting when the communication link is reestablished between the telephone headset and the amplifier and for generating the output signal in a second state in response thereto; and the activating means is additionally for changing the parameter in response to the second state of the output signal in a manner that emulates the reconnection of a peripheral device to the telephone system even though the amplifier has not been disconnected.

17. The amplifier of claim 1, wherein:

a signal path for a signal having a signal strength associated therewith provides the communication link between the telephone headset and the amplifier; and the detecting means includes plural conductors and determining means for determining when a detection parameter changes as a result of the signal strength being reduced below a preselected value, the detection parameter being chosen from a group including:

a current through one of the plural conductors;

a resistance between two of the plural conductors; and a voltage on one of the plural conductors.

18. The amplifier of claim 17, wherein:

the determining means includes:

means for communicating an ac signal having an amplitude between the telephone headset and the amplifier; and means for measuring the amplitude of the ac signal on the one of the plural conductors and providing the output signal in response thereto.

19. A method of activating an automatic monitoring circuit in a telephone system by interrupting a communication link between a telephone headset and an amplifier connected to the telephone system, wherein the automatic monitoring circuit is for monitoring when a peripheral device is connected to the telephone system by detecting a change in a parameter which occurs when the peripheral device is disconnected from the telephone system, the method comprising the steps of:

detecting an interruption of the communication link between the telephone headset and the amplifier and generating an output signal in response thereto; and changing the parameter in response to the output signal in a manner to emulate the disconnection of the peripheral device from the telephone system even though the amplifier remains connected.

20. The method of claim 19, wherein the parameter is a current.

21. The method of claim 19, wherein the parameter is a resistance.

22. The method of claim 19, wherein:

the parameter is a current drawn from the telephone system;

the amplifier draws current from the telephone system; and in the step of changing the parameter in response to the output signal, the current drawn from the telephone system by the amplifier is changed in response to the output signal.

23. The method of claim 22, wherein, in the step of changing the parameter in response to the output signal, the current drawn from the telephone system by the amplifier is greater when the communication link is established between the telephone headset and the amplifier than when the communication link between the telephone headset and the amplifier is interrupted.

24. The method of claim 22, wherein the automatic monitoring circuit in the telephone system additionally detects a change in the parameter which occurs when the peripheral device is reconnected to the telephone system, and wherein the method additionally includes the steps of:

detecting when the communication link is reestablished between the telephone headset and the amplifier and generating an additional output signal in response thereto; and changing, in response to the additional output signal, the parameter in a manner that emulates the reconnection of the peripheral device to the telephone system even though the amplifier has not been disconnected.

25. The method of claim 19, wherein:

the parameter is a resistance between a first conductor and a second conductor, the first and second conductors being connected to the telephone system; and in the step of changing the parameter in response to the output signal, the resistance between the first conductor and the second conductor is changed in response to the output signal.

26. The method of claim 25, wherein:

a signal path for a signal having a signal strength associated therewith provides the communication link between the telephone headset and the amplifier; and the step of detecting an interruption of the communication link between the telephone headset and the amplifier includes the step of determining when a detection parameter changes as a result of the signal strength being reduced below a preselected value, the detection parameter being chosen from a group including:

a current through one of a plurality of conductors;

a resistance between two of the plurality of conductors; and a voltage on one of the plurality of conductors.

27. The method of claim 26, wherein the automatic monitoring circuit in the telephone system additionally detects a change in the parameter which occurs when the peripheral device is reconnected to the telephone system, and wherein the method additionally includes the steps of:

detecting when the communication link is reestablished between the telephone headset and the amplifier and generating an additional output signal in response thereto; and changing, in response to the additional output signal, the parameter in a manner that emulates the reconnection of the peripheral device to the telephone system even though the amplifier has not been disconnected.

28. The method of claim 19, wherein the automatic monitoring circuit in the telephone system additionally detects a change in the parameter which occurs when the peripheral device is reconnected to the telephone system, and wherein the method additionally includes the steps of:

detecting when the communication link is reestablished between the telephone headset and the amplifier and generating an additional output signal in response thereto; and changing, in response to the additional output signal, the parameter in a manner that emulates the reconnection of the peripheral device to the telephone system even though the amplifier has not been disconnected.

29. A method of activating an automatic monitoring system in a telephone system by interrupting a communication link between a telephone headset and an amplifier connected to the telephone system, the amplifier being connected to the telephone system by a connection including a plug and socket coupling, wherein the automatic monitoring system is for monitoring when the amplifier is physically disconnected from the telephone system by detecting a change in a parameter which occurs when the plug and socket coupling is physically disconnected, the method comprising the steps of:

interrupting the communication link between the telephone headset and the amplifier while leaving the plug and socket coupling between the amplifier and the telephone system physically connected; and changing, in response to the interrupting step, the parameter in a manner to emulate disconnecting the plug and socket coupling even though the plug and socket coupling remains physically connected.

30. The method of claim 29, wherein the parameter is a current.

31. The method of claim 29, wherein the parameter is a resistance.

32. The method of claim 29, wherein:

the method additionally comprises the step of generating a control signal in response to the interrupting step; and in the changing step, the parameter is changed in response to the control signal.

33. The method of claim 29, wherein:

the amplifier draws current from the telephone system;

the parameter is the current drawn by the amplifier from the telephone system; and in the changing step, the current drawn by the amplifier is reduced in response to the interrupting step to emulate disconnecting the plug and socket coupling.

34. The method of claim 29, wherein:

two conductors interrupted by the plug and socket coupling connect the amplifier to the telephone system;

the parameter is a resistance between the two conductors; and in the changing step, the resistance between the conductors is increased in response to the interrupting step to emulate disconnecting the plug and socket coupling.

* * * * *